(12) United States Patent
Chakravorty et al.

(10) Patent No.: US 7,418,163 B2
(45) Date of Patent: Aug. 26, 2008

(54) OPTOELECTRICAL PACKAGE

(76) Inventors: Kishore K. Chakravorty, 6407 Berkwickshire Way, San Jose, CA (US) 95120; Joseph F. Ahadian, 2327 Paseo Saucedal, Carlsbad, CA (US) 92009; Johanna Swan, 19815 N. 84th way, Scottsdale, AZ (US) 85255; Thomas P. Thomas, 17337 NW. Gold Canyon La., Beaverton, OR (US) 97006; Brandon C. Barnett, 10620 SW. Oriole Cir., Beaverton, OR (US) 97007; Ian Young, 3181 NW. 114th Ter., Portland, OR (US) 97201

( * ) Notice: Subject to any disclaimer, the term of this patent is extended or adjusted under 35 U.S.C. 154(b) by 0 days.

(21) Appl. No.: 10/109,313

(22) Filed: Mar. 28, 2002

(65) Prior Publication Data

US 2003/0185484 A1   Oct. 2, 2003

(51) Int. Cl.
*G02B 6/12* (2006.01)

(52) U.S. Cl. .......................... 385/14; 385/129; 385/130

(58) Field of Classification Search .................... 385/14, 385/88, 89, 92, 94
See application file for complete search history.

(56) References Cited

U.S. PATENT DOCUMENTS

| | | | |
|---|---|---|---|
| 4,732,446 A | 3/1988 | Gipson et al. ................ 385/24 |
| 5,150,280 A | 9/1992 | Arai et al. .................... 361/783 |
| 5,521,992 A | 5/1996 | Chun et al. ..................... 385/14 |
| 6,343,171 B1 | 1/2002 | Yoshimura et al. ............. 385/50 |
| 6,393,169 B1 | 5/2002 | Paniccia et al. ................ 385/14 |
| 6,470,117 B1 * | 10/2002 | Tang et al. ..................... 385/43 |
| 6,599,031 B2 * | 7/2003 | Li ................................. 385/88 |
| 6,603,915 B2 * | 8/2003 | Glebov et al. ................ 385/129 |
| 6,650,802 B1 * | 11/2003 | Morse et al. ................... 385/17 |
| 6,661,943 B2 * | 12/2003 | Li ................................. 385/18 |
| 6,690,845 B1 * | 2/2004 | Yoshimura et al. ............. 385/14 |
| 6,910,812 B2 * | 6/2005 | Pommer et al. ................ 385/92 |
| 2002/0145187 A1 * | 10/2002 | Baxter et al. ................. 257/678 |
| 2003/0185484 A1 * | 10/2003 | Chakravorty et al. .......... 385/14 |

* cited by examiner

*Primary Examiner*—Sung H Pak
(74) *Attorney, Agent, or Firm*—Blakely, Sokoloff, Taylor & Zafman LLP

(57) ABSTRACT

An integrated optoelectrical package for optoelectrical integrated circuits (ICs) is disclosed. The package includes a package substrate having contact receiving members on an upper surface. The contact receiving members are electrically connected to contacts on the lower surface. An optoelectronic receiver package and an optoelectronic transmitter package are each electrically mounted to respective first and second subsets of the contact receiving members. Input and output waveguide arrays are formed atop the substrate package and are optically coupled to the optoelectronic receiver package and the optoelectronic transmitter package, respectively. The contacts on the lower surface of the package substrate are designed to contact and engage the contact receiving members of a standard printed circuit board (PCB).

18 Claims, 6 Drawing Sheets

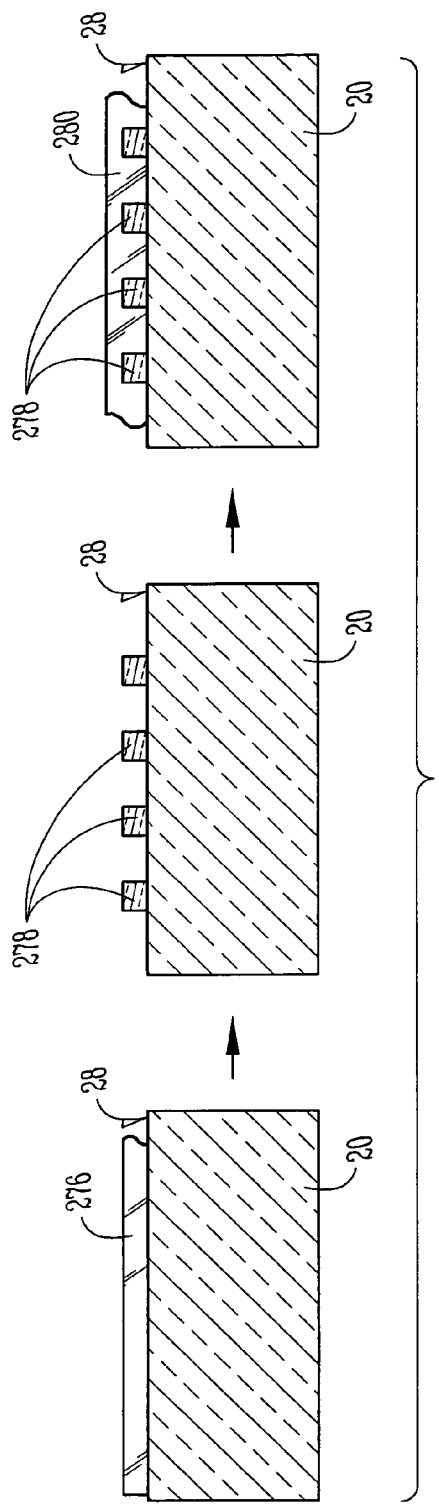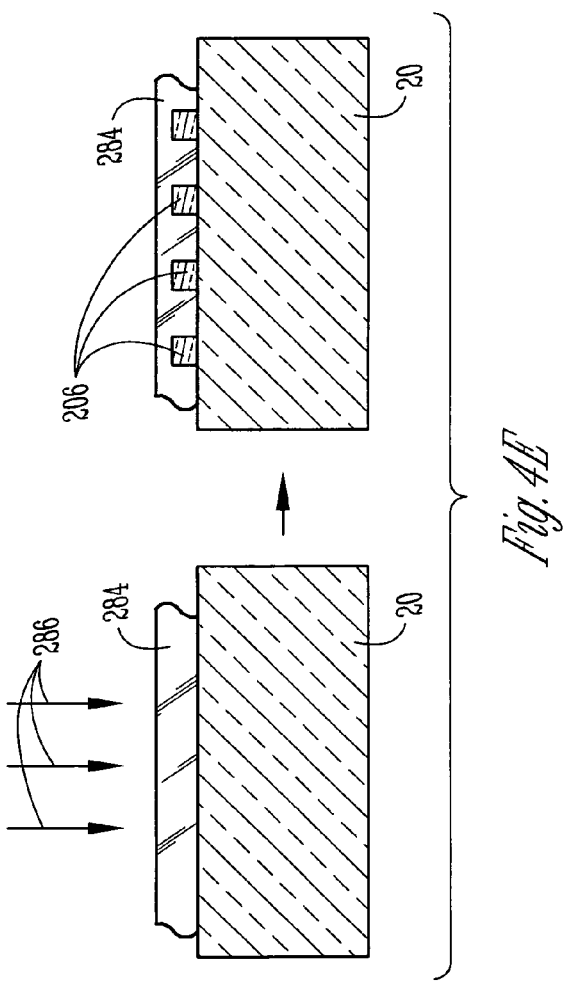

OPTOELECTRICAL PACKAGE

FIELD OF THE INVENTION

The present invention relates to integrated circuit packaging, and in particular relates to packaging optical and optoelectronic devices in a low-cost configuration.

BACKGROUND OF THE INVENTION

The manufacturing of electronic and optoelectronic integrated circuits (ICs) involves complex lithographic processes to form microscopic solid-state devices and circuits in semiconductor wafers. These lithographic processes typically include forming layers of material on the wafer, patterning the layers, doping the substrate and/or the patterned layers, and heat-treating (e.g., annealing) the resulting structures. These processes are repeated to build up the IC structure. The result is a wafer containing a large number of ICs.

A "wafer sort" is then performed, wherein each IC chip on the wafer is electrically tested for functionality. The wafer is then separated ("diced") into the individual IC chips, which are then "packaged" individually or in groups for incorporation onto a printed circuit board (PCB) or a chip-on-board (COB).

An IC package is designed to provide physical and environmental protection for one or more IC chips, and electrical and/or optical interconnections with other IC chips or to a PCB. However, the typical IC chip has electrical leads with a periodic spacing (pitch) on the order of a hundred microns, whereas a PCB has an electrical contact pitch on the order of a millimeter or so. Thus, when interfacing an IC chip to a PCB, a substrate package that performs the necessary spatial transformation between the IC chip leads and the PCB contacts is often used.

As ICs have found more applications, the need for special package designs has increased. In particular, the development of optoelectronic ICs with semiconductor light sources in the form of light-emitting diodes (LEDs), semiconductor lasers and vertical-cavity surface emitting lasers (VCSELs), has lead to a need for standardized, low-cost "optoelectrical" IC package that can accommodate both electrical and optoelectronic IC chips.

Presently, optoelectronic and electrical chips are combined in a single "optoelectrical" substrate package using specialized designs and techniques tailored to the individual chips being packaged. This approach may be suitable for limited applications involving a small number of optoelectrical packages. However, it is not a cost-effective or practical approach when packaging optoelectronic and electrical chips in the large numbers associated with large-scale manufacturing. Further, to maintain cost-effectiveness, it is important that the package and packaging process be compatible with conventional PCBs and other parts commonly used in the electronics industry.

What is needed is a cost-effective optoelectronic package for electronic and optoelectronic IC chips that provides both optical and electrical functionality while being compatible with conventional PCBs.

BRIEF DESCRIPTION OF THE DRAWINGS

FIG. 4D is a series of cross-sectional views of the package substrate illustrating the formation of a waveguide array using standard lithographic techniques;

FIG. 4E is a series of cross-sectional views of the package substrate illustrating the formation of a waveguide array by selectively exposing a photosensitive layer formed on the upper surface of the package substrate;

DETAILED DESCRIPTION OF THE INVENTION

In the following detailed description of the embodiments of the invention, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
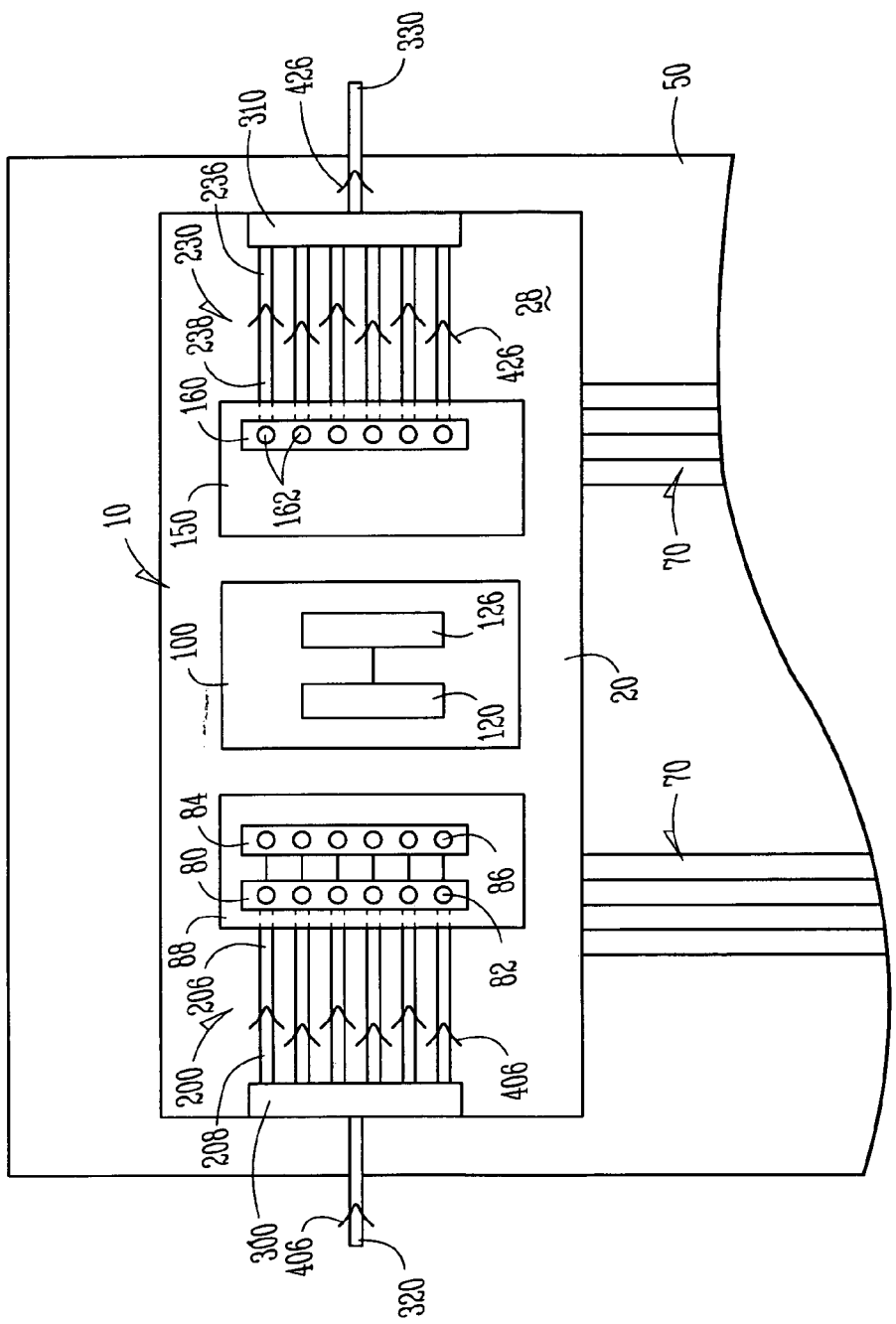
FIG. 1 is a top-down perspective diagram of the optoelectrical package of the present invention as supported on a printed circuit board (PCB)
Figure 2:
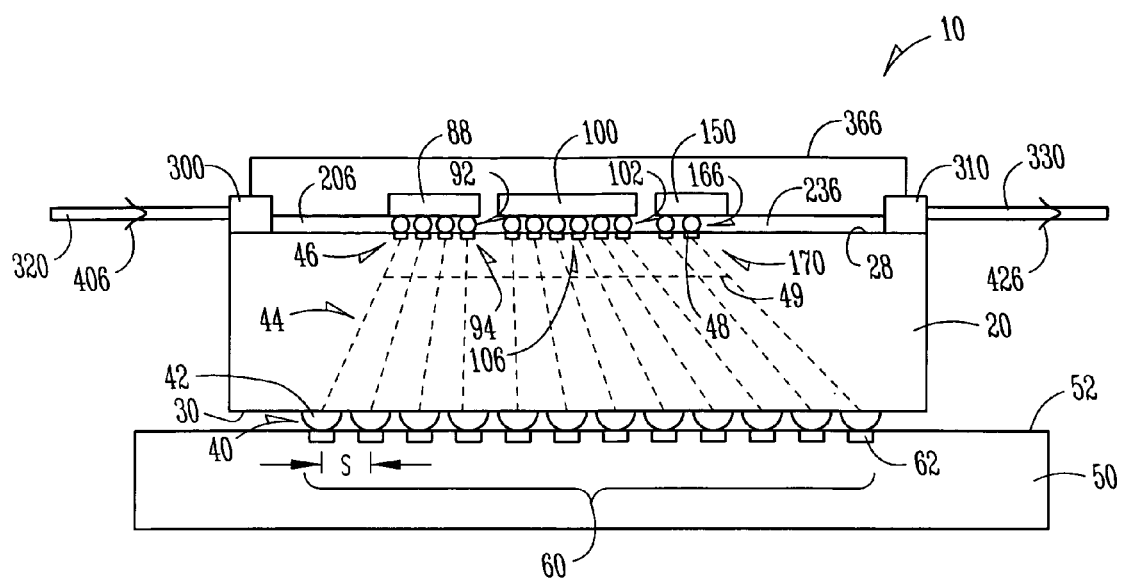
FIG. 2 is a side view of the optoelectrical package and PCB of FIG. 1.

With reference to FIGS. 1 and 2, there is shown an optoelectrical package 10 of the present invention. Optoelectrical package 10 includes a package substrate 20 that has an upper surface 28 and a lower surface 30. Package substrate 20, also referred to in the art as an "interposer," is a passive interface device designed to provide the necessary spatial transformation between the small-pitch electrical connections (leads) of an overlying IC chip and the larger-pitch electrical contacts of an underlying PCB. Package substrate 20 may be, for example, a pin-grid array (PGA) or a ball-grid array (BGA). In FIG. 2, a flip-chip BGA package substrate is shown for the sake of illustration.

Package substrate 20 includes on lower surface 30 a set 40 of contacts 42, which in the case of a flip-chip BGA are balls of conductive material (e.g., SnPb) and in the case of a flip-chip PGA array are pins. Contacts 42 are electrically connected by electrical interconnections 44 to a set 46 of contact receiving members 48 formed on upper surface 28. In an example embodiment, contact receiving members 48 are also connected to each other, as illlustrated schematically by electrical interconnection 49. A package substrate 20 suitable for use in the present in invention is manufactured by Ibiden Co, Ltd, Japan. An advantage of the present invention is that it can employ a commercially available package substrate, which reduces the cost of the optoelectrical package.

In forming a typical electronic or optoelectronic device, a number of package substrates 20 supporting various types of ICs (e.g., logic, memory, etc.) are electrically interconnected. In the example embodiment shown in FIG. 2, package substrate 20 is mounted to a printed circuit board (PCB) 50 that has an upper surface 52. A set 60 of contact receiving members 62 is formed on upper surface 52 and is designed to receive and engage package substrate contacts 42. In one example, contact receiving members 62 are holes and contacts 42 are pins. In another example, contact receiving members 62 are contact pads and contacts 42 are balls. Both pin/hole an ball/pad contact IC chip mounting systems are known in the art of semiconductor manufacturing and packaging. For the sake of illustration and continuity, the discussion below refers to and FIG. 2 shows contact receiving members 48 and 62 as contact pads, and the associated contacts as ball-type (e.g., solder ball) contacts. One skilled in the art will appreciate that any of the known contact/contact-receiving-member systems can be used in the present invention.

Contact pads 62 can have any spacing S, but preferably have a standard periodic spacing (pitch), e.g., 1.27 mm, 1 mm or 0.5 mm Package substrate contacts 42 also have a spacing or "footprint" the same as that of contact pads 60 so that each of the package substrate contacts makes contact with one of the contact pads on PCB 50.

Figure 3:
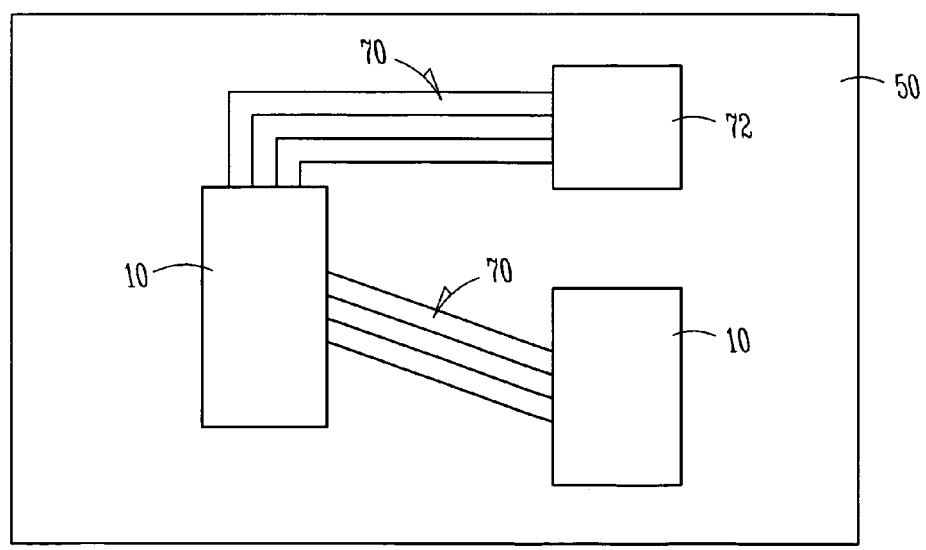
FIG. 3 is a plan view of a PCB with two of the optoelectronic packages of the present invention, with one of the optoelectronic packages coupled to an optoelectronic or optical device via wiring on the PCB.

With reference also to FIG. 3, PCB 50 also includes wiring 70 leading away from contact pads 60. Wiring 70 provides electrical connections with other devices on PCB 50, such as other optoelectrical packages 10 or a device 72. Device 72 may be, for example, a power supply or an IC chip such as a memory or logic chip. Wiring 70 thus may serve as a conduit for providing power to and receiving power from another optoelectric package 10 and/or device 72.

Photodetector Package

Optoelectrical package 10 further includes on upper surface 28 of package substrate 20 a photodetector array 80 comprising photodetectors 82. Photodetector array 80 is coupled to a transimpedence amplifier array 84 comprising transimpedence amplifiers 86. Transimpedence amplifier array 84 can be integrated with the photodetector array 80 to form a photodetector package 88, as shown. Photodetector package includes external contacts 92. In one example embodiment, photodetector package 88 is a flip-chip ball grid array (FCBGA) with ball-type contacts 92, as shown in FIG. 2. In another example embodiment, photodetector package 88 is a flip chip pin grid array (FCPGA) with pin-type contacts. A subset 94 of contact pads 46 is designed to receive and engage photodetector package contacts 92 for electrically mounting the photodetector package to the substrate package.

CPU Package

Optoelectrical package 10 further includes a central processing unit (CPU) package electrically mounted to upper surface 28 adjacent photodetector package 88. CPU package 100 includes contacts 102 that contact a corresponding subset 106 of contact pads 46 designed to receive and engage the CPU package contacts to achieve the electrical mounting. In one example embodiment, CPU package 100 is a flip-chip ball grid array (FCBGA), as shown in FIG. 2. In another example embodiment, CPU package 100 is a flip chip pin grid array (FCPGA). CPU package 100 includes a vertical-cavity surface emitting laser (VCSEL) driver 120 electrically connected to transimpedence amplifiers 126.

VCSEL Package

Optoelectrical package 10 also includes a flip-chip VCSEL package 150 electrically mounted to upper surface 28 of substrate package 20. VCSEL package 150 includes a VCSEL array 160 comprising VCSELS 162. VCSELS 162 are arranged so that they emit light downward toward upper surface 28. VCSEL package 150 includes contacts 166 that make contact with a subset 170 of contact pads 46 designed to receive and engage the VCSEL package contacts to achieve the electrical mounting. In one example embodiment, VCSEL package 150 is a flip-chip ball grid array (FCBGA), as shown in FIG. 2. In another example embodiment, VCSEL package 150 is a flip chip pin grid array (FCPGA). VCSEL driver 120 in CPU package 100 is electrically connected to VCSEL package 150 and controls the operation of VCSELS 162 in VCSEL array 160.

Waveguide Arrays

With continuing reference to FIGS. 1 and 2, also formed atop upper surface 28 is an input waveguide array 200 comprising waveguides 206 each having an input end 208 and an output end 210. Waveguide array 200 is arranged so that each waveguide 206 is optically coupled at output end 210 to a photodetector 82 in photodetector package 88.

Further included atop surface 28 is an output waveguide array 230 comprising waveguides 236 each having an input end 238 and an output end 240. Output waveguide array 230 is arranged so that each waveguide 236 is optically coupled at input end 238 to a VCSEL 162.

Figure 4A:
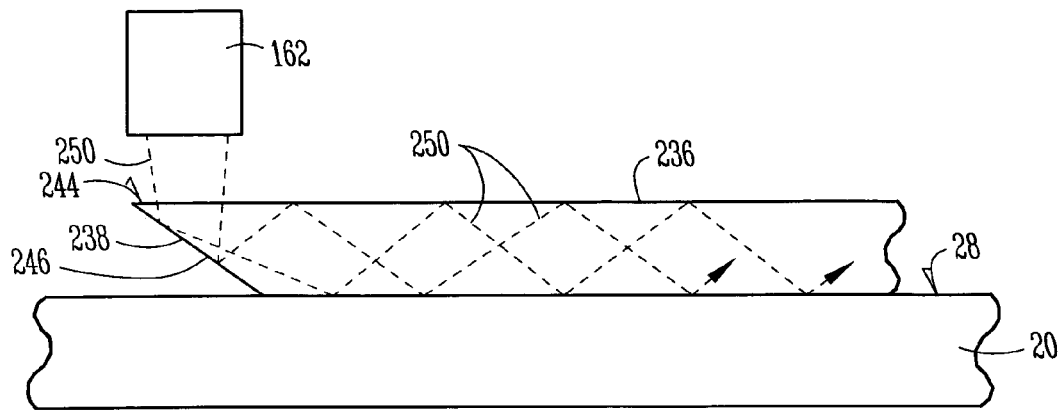
FIG. 4A is a close-up side view of a vertical cavity surface emitting laser (VCSEL) in the array of VCSELs coupled to one of the waveguides in the output waveguide array via a bevel formed in the waveguide.

With reference to FIG. 4A, in an example embodiment, waveguides 236 are coupled to VCSELs 162 via reflective coupling. Input end 238 of waveguide 236 includes an upper surface portion 244 and a bevel 246 arranged beneath the upper surface portion. Bevel 246 forms a reflector at the input end of the waveguide. Upper surface portion 244 is then arranged underneath VCSEL 162 so that light 250 eminating from the VCSEL passes through the upper surface portion and internally reflects from bevel 246, which is angled to directs the light down waveguide 236.

Figure 4B:
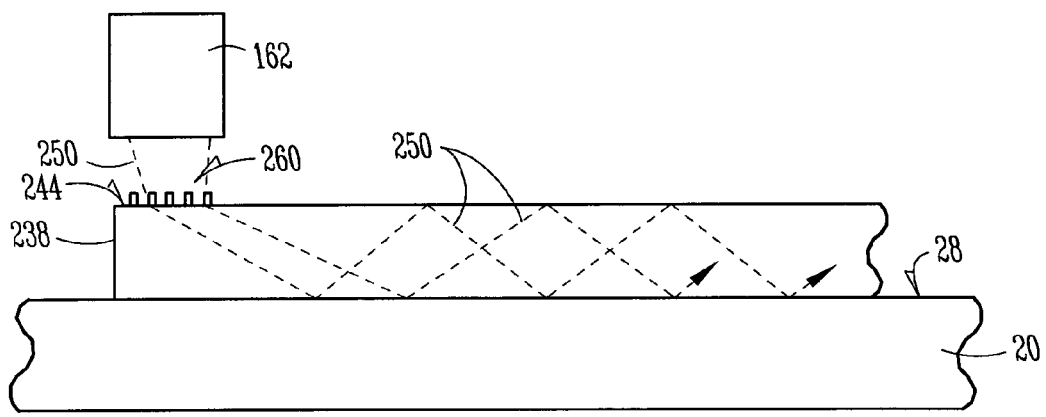
FIG. 4B is a close-up side view of a VCSEL in the array of VCSELs coupled to one of the waveguides in the output waveguide array via a grating formed on a portion the waveguide surface that lies beneath the VSCEL.

With reference to FIG. 4B, in another example embodiment, waveguides 236 are coupled to VCSELs 162 via grating coupling. Input end 238 of waveguide 236 includes a grating 260 formed on upper surface portion 244. Grating 260 is preferably designed to directionally diffract light 250. Upper surface portion 244 of waveguide 236 is arranged underneath VCSEL 162 so that light 250 diffracts from grating 260 and propagates down the waveguide.

In an example embodiment, input waveguide array 200 and output waveguide array 230 comprise a polymer waveguide sheet laminated to upper surface 28. Polymer waveguides are particularly well suited for transmitting light of infrared wavelength (e.g., 0.850 microns, 1.3 microns, 1.55 microns, etc), which are commonly used wavelengths for chip-to-chip and other optical telecommunications applications. Also, polymer waveguides are well-suited for use with package substrate 20, which in an example embodiment is also formed from a polymer. Suitable polymer waveguide sheets are available from Optical Crosslinks, Inc., Kennet Square, Pa.

Figure 4C:
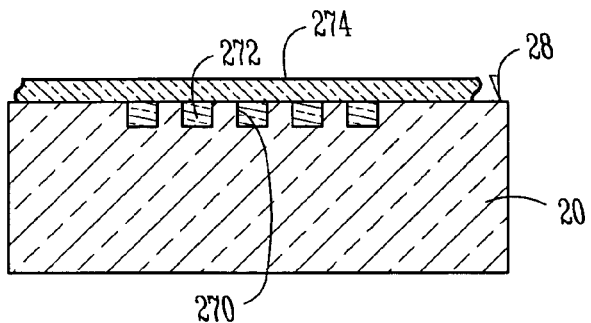
FIG. 4C is a cross-sectional view of the package substrate, wherein channel waveguides have been formed in the upper surface.

Waveguide arrays 200 and 230 may also be formed in upper surface 28 using standard waveguide fabrication techniques. With reference to FIG. 4C, one such technique includes forming channels 270 in upper surface 28 and filling the channels with a high-index material 272, such as a high-index polyimide. The filled channels are then covered with a low-index cladding layer 274, such as a low-index polyimide.

The formation of buried waveguide channels may be preferred when it is desirable to attain clearance between the waveguide arrays and either the photodetector package 100 or VCSEL package 150.

With reference to FIG. 4D, another technique for forming waveguide arrays 200 and 230 involves depositing a first layer 276 of high-index core material, patterning the first layer to form waveguide cores 278, and then depositing a low-index cladding layer 280 atop the waveguide cores.

With reference to FIG. 4E, another technique for forming waveguide arrays 200 and 230 involves depositing a layer 284 of photosensitive polymer that undergoes a change in refractive index when exposed to a select wavelength of radiation. An example polymer is acrylate, available from Dupont, Inc., Wilmington, Del. The waveguides (e.g., waveguides 206) are then formed by selectively irradiating and processing the photosensitive polymer with radiation 286 of the select wavelength (e.g., by masking the layer 284).

Waveguide Connectors and Optical Cables

Figure 5A:
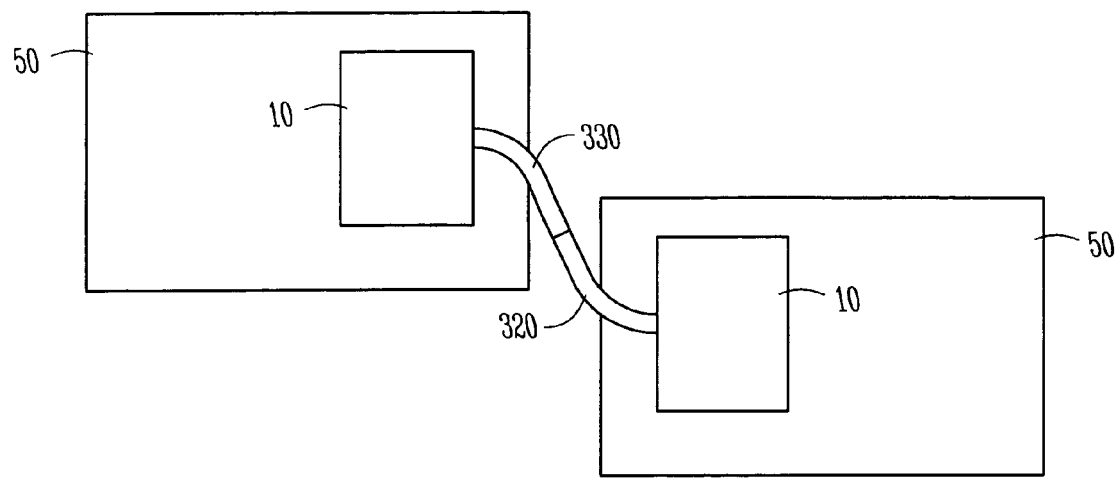
FIG. 5A is a schematic plan view of two optoelectrical packages mounted on two different PCBs and coupled together via their input and output optical cables.
Figure 5B:
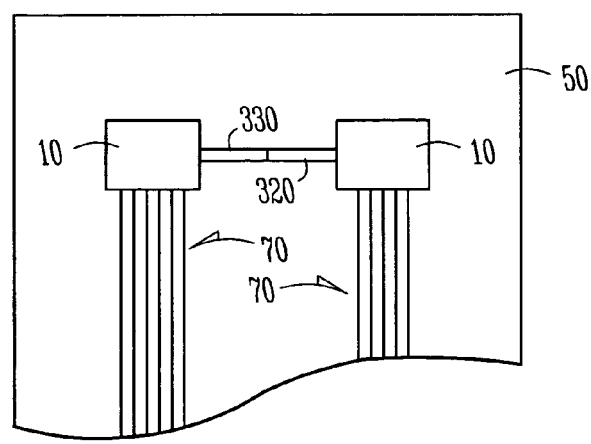
FIG. 5B is a schematic plan view of two optoelectrical packages mounted on the same PCB and coupled together via their input and output optical cables.
Figure 5C:
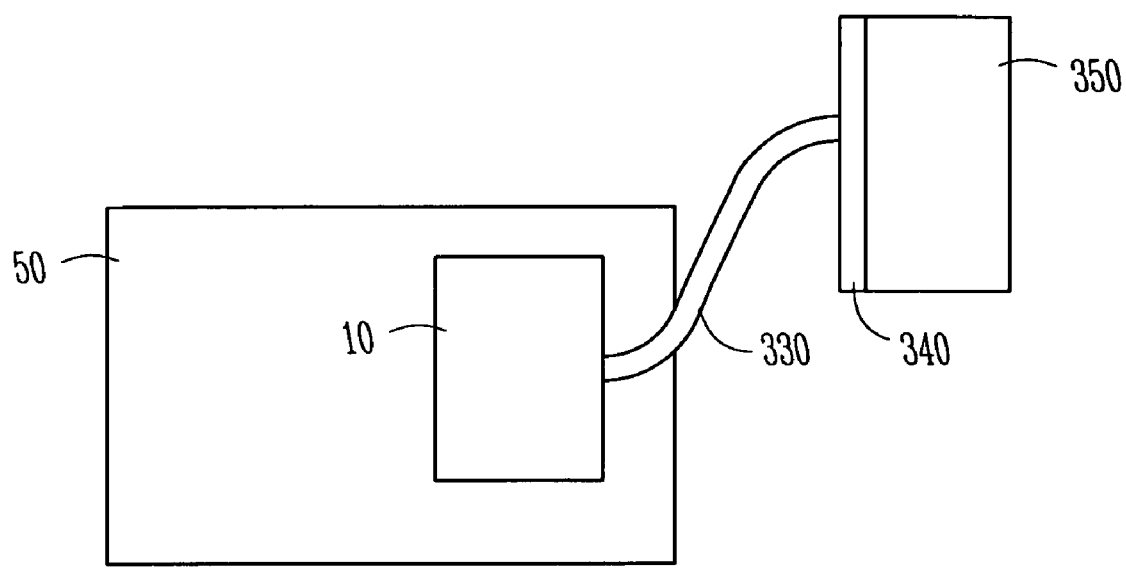
FIG. 5C is a schematic plan view an optoelectrical package mounted to a PCB and connected to the backplane of an external device via its output optical cable.

With reference again to FIGS. 1 and 2, optoelectrical package 10 further includes an input waveguide connector 300 connected to input end 208 of input waveguide array 200, and an output waveguide connector 310 connected to output end 240 of output waveguide array 230. Input waveguide connector 300 provides a connection between input waveguide array 200 and an external input optical cable 320. Input optical cable may include, for example, a optical fiber, a fiber bundle, or a laminated array of waveguides. Likewise, output waveguide connector 310 provides a connection between output waveguide array 230 and an external output optical cable 330 similar to or identical to optical cable 320. In an example embodiment, waveguide connectors 300 and 310 are MT slot connectors, available from Optical Crosslinks, Inc. Optical cables 320 and 330 provide optical communication between optoelectrical packages 10 located on the same or different PCB, such as illustrated in FIG. 5A and 5B, or between an optoelectrical package and a backplane 340 of a remote optical or optoelectronic device 350, such as illustrated in FIG. 5C.

Protective Housing

Optoelectric package 10 also optionally includes a top-side protective housing 366 (FIG. 2) that covers at least a portion of waveguide connectors 300 and 310, waveguide arrays 200 and 230, photodetector package 88, CPU package 100 and VCSEL package 150. In example embodiments, housing 366 is formed from molded epoxy, plastic or ceramic, and is bonded to or otherwise affixed to package substrate 20.

Method of Operation

Optoelectrical package 10 operates to receive an input optical signal and generate an output optical signal. Accordingly, in operation input optical cable 320 carries one or more input optical signals 406, which are distributed by input waveguide connector 300 to waveguides 206 in input waveguide array 220. Optical signals 406 propagate down respective waveguides 206 and are received and detected by photodetectors 82 in photodetector package 88. Each photodetector 82 converts the detected optical signal 406 to a photocurrent, which is converted to an input voltage signal by the associated transimpedence amplifier 86. Thus, photodectector system package 88 serves as an optoelectronic receiver. The input voltage signals are then provided to PCB 50 via electrical interconnections 44 in package substrate 20 and select contacts 42.

The input voltage signals are then processed by device 72 residing on the PCB or located elsewhere. In an example embodiment, the processing includes logic operations. In another exmaple, embodiment, the processing includes memory operations involving storing and accessing bits of information to and from memory. In yet another example embodiment, both logic and memory processing is performed.

Device 72 then provides output voltage signals to CPU package 100 via select contacts 42 and the electrical connections 44 in substrate package 20. VCSEL driver 120 in combination with transimpedence amplifiers 126 produce an output current that passes through electrical interconnections 49 (or alternatively, down to PCB 50 and back up through substrate package 20) to VCSEL package 150. The output current drives VCSELs 162 in VCSEL array 160 to emit output optical signals 426. Thus, CPU package 100 and VCSEL package 120 together serve as an optoelectronic transmitter. In an example embodiment, power is provided to photodetector package 88, CPU package 100, and VCSEL package 150 through package substrate 20 via a power source (e.g., a power supply device 72; see FIG. 3) on PCB 50.

As discussed above in connection with FIGS. 4A and 4B, optical signals 426 formed from light 250 are then coupled to input ends 238 of waveguides 236 in output waveguide array 230. Optical signals 426 are then passed from waveguide output ends 240 to output optical cable 330 via output waveguide connector 310. Optical signals 426 are then outputted from output optical cable 330 and received by another optoelectrical package 10 (FIGS. 5A, 5B) or another device 350 (FIG. 5C).

Method of Fabrication

Optoelectrical package 10 is fabricated by forming in substrate package 20 the sets of contact receiving members (pads) 94, 106 and 170, wherein each contact set is adapted to receive and engage contacts 92, 102 and 166 from photodetector package 88, CPU package 100 and VCSEL package 150, respectively. Next, waveguide arrays 200 and 230 are formed atop upper surface 28. As mentioned above, waveguide arrays 200 and/or 300 may be made of pre-formed sheets of polymer laminated to upper surface 28. Alternatively, waveguide arrays 200 may be formed using any one of the techniques described above.

Once the waveguide arrays are formed, photodetector package 88, CPU package 100 and VCSEL package 150 are mounted to their respective contacts, with the photodetector package aligned to waveguide array 200 and VSCEL package aligned to waveguide array 230. In the case where a ball/contact pad system is used, the packages are engaged with their respective contact pads by performing solder re-flow.

Once packages 88, 100 and 150 are mounted in place, then optical connectors 300 and 310 are attached to waveguide arrays 200 and 300, respectively. The top-side protective housing 366 may then be formed over packages 88, 100 and 150, over waveguide arrays and over at least a portion of optical connectors 300 and 310 to protect and seal optoelectrical package 10.

Optical cables 320 and 330 are then connected to optical connectors 300 and 310, respectively. Optical cables may then be connected to external devices, such as other optoelectrical packages 10 (FIGS. 5A, 5B) or backplane 340 of a remote optical or optoelectronic device 350 (FIG. 5C).

The method of fabrication need not be carried out in the order described above. In an example embodiment, it may be preferred to first place packages 88 and 150 on package substrate 20, and then form the waveguide arrays atop upper surface 28 of the package substrate. Performing solder re-flow after the waveguide arrays are formed can be used to self-align photodetectors 82 in photodetector package 88 with waveguides 206 in waveguide array 200, and/or to self-align VCSELs 162 in VCSEL package 150 with waveguides 236 in waveguide array 230. The self-alignment is accomplished via the surface tension pull of solder.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. An optoelectrical package, comprising:
   a package substrate having an upper surface with first contact receiving members and a lower surface with first contacts in electrical communication with the first contact receiving members;
   an optoelectronic receiver electrically coupled to a first set of the first contact receiving members and disposed on an input waveguide array formed on the upper surface, the input waveguide array operable to receive an input optical signal;
   an optoelectronic transmitter electrically coupled to a second set of the first contact receiving members and optically coupled to an output waveguide array formed on the upper surface and operable to transmit an output optical signal produced by the optoelectronic transmitter in response to the input optical signal; and
   input and output waveguide connectors respectively coupled to the input and output waveguide arrays.

2. The optoelectrical package of claim 1, wherein the optoelectronic receiver includes a photodetector package.

3. The optoelectrical package of claim 2, wherein the photodetector package includes:
   an array of photodetectors coupled to the input waveguide array; and
   an array of transimpedance amplifiers coupled to the photodetector array.

4. The optoelectrical package of claim 1, wherein the optoelectronic transmitter includes a central processing unit (CPU) package and a vertical cavity surface emitting laser (VCSEL) package.

5. The optodectrical package of claim 4, wherein the CPU package includes a VCSEL driver to control the VCSEL package.

6. The optoelectrical package of claim 5, wherein the VCSEL package includes an array of VCSELs, with each VCSEL optically coupled to a waveguide in the output waveguide array.

7. The optoelectrical package of claim 1, wherein the first contacts include ball-type contacts designed to engage a corresponding set of contact receiving members of a printed circuit board.

8. The optoelectrical package of claim 7, wherein the first contact receiving members are to receive ball-type contacts.

9. The optoelectrical package of claim 1, further including:
   an input optical cable coupled to the input waveguide connector and operative to carry the input optical signal; and
   an output optical cable coupled to the output waveguide connector and operative to carry the output optical signal.

10. The optoelectrical package of claim 9, wherein at least one of the input and output optical cables is operatively coupled to an optical device or an optoelectronic device.

11. The optoelectrical package of claim 1, wherein at least one of the input and output waveguide arrays comprises polymer waveguides.

12. package, comprising:
    a substrate having an upper surface with first contact receiving members and a lower surface with first contacts in electrical communication with the first contact receiving members;
    an optoelectronic receiver formed over the upper surface of the substrate and electrically coupled to a first set of the first contact receiving members and optically coupled to an input waveguide array formed on the upper surface, the input waveguide array operable to receive an input optical signal;
    an optoelectronic transmitter electrically coupled to a second set of the first contact receiving members and disposed on an output waveguide array formed on the upper surface and operable to transmit an output optical signal produced by the optoelectronic transmitter in response to an output current originating from the input optical signal;
    an integrated circuit on the substrate, electrically coupled to at least one of the first and second sets of contact receiving members, the integrated circuit to provide the output current to the optoelectronic transmitter, wherein communication from the optoelectronic receiver to the optoelectronic transmitter, through the integrated circuit, includes the output current; and
    a waveguide connector coupled to one of the input or output waveguide arrays and to an optical cable to provide optical communication to another package.

13. The package of claim 12, wherein the another package is located on a separate substrate.

14. The package of claim 13, wherein the substrate is mounted above a first printed circuit board and the separate substrate is mounted above a second printed circuit board.

15. The package of claim 12 wherein the input and output waveguide arrays are polymer waveguide arrays and the optical cable comprises optical fiber.

16. An optoelectrical system, comprising:
    a package substrate having an upper surface with first contact receiving members and a lower surface with first contacts in electrical communication with the first contact receiving members;
    an optoelectronic receiver electrically coupled to a first set of the first contact receiving members and disposed on an input waveguide array formed on the upper surface, the input waveguide array operable to receive an input optical signal, the optoelectronic receiver to provide an input voltage signal associated with the input optical signal;
    an optoelectronic transmitter electrically coupled to a second set of the first contact receiving members and optically coupled to an output waveguide array formed on the upper surface and operable to transmit an output optical signal produced by the optoelectronic transmitter in response to an output current associated with the input voltage signal and originating from the input optical signal, wherein communication from the optoelectronic receiver to the optoelectronic transmitter includes the input voltage signal; and
    input and output waveguide connectors respectively coupled to the input and output waveguide arrays.

17. The package of claim 16 further comprising:
    a central processing unit package formed on the substrate, electrically coupled to at least one of the first and second sets of contact receiving members, the central processing unit package to provide the output current associated with the input voltage signal to the optoelectronic transmitter, wherein communication from the optoelectronic receiver to the optoelectronic transmitter is through the central processing unit package.

18. The package of claim 17 further comprising:

a device coupled with the package substrate through the first contacts of the lower surface, the device to process the input voltage signal and to provide an output voltage signal based on the processed input voltage signal, the output voltage signal to be provided to the central processing unit to produce the output current.

* * * * *